United States Patent [19]

Hashida

[11] Patent Number: 5,238,018
[45] Date of Patent: Aug. 24, 1993

[54] PROPORTIONAL PRESSURE CONTROL VALVE

[75] Inventor: Koichi Hashida, Itami, Japan

[73] Assignee: Sumitomo Electric Industries, Ltd., Osaka, Japan

[21] Appl. No.: 980,926

[22] Filed: Nov. 24, 1992

[30] Foreign Application Priority Data

Nov. 29, 1991 [JP] Japan .................. 3-316751

[51] Int. Cl.⁵ ............................................. F16K 11/04
[52] U.S. Cl. ................................. 137/112; 137/625.4
[58] Field of Search ............... 137/111, 112, 113, 114, 137/625.4

[56] References Cited

U.S. PATENT DOCUMENTS

| | | | |
|---|---|---|---|
| 1,849,702 | 3/1932 | Bard | 137/113 |
| 2,358,228 | 9/1944 | Hoof | 137/113 |
| 2,549,897 | 4/1951 | Eurell | 137/114 |
| 3,224,455 | 12/1965 | Alfieri | 137/113 |
| 4,018,244 | 4/1977 | Burns | 137/113 |
| 4,187,871 | 2/1980 | Hendrickson | 137/112 |
| 4,519,413 | 5/1985 | Wagenseil et al. | 137/111 |

*Primary Examiner*—Stephen M. Hepperle
*Attorney, Agent, or Firm*—Wenderoth, Lind & Ponack

[57] ABSTRACT

A proportional pressure control valve having a sleeve having a high-pressure source port, a low-pressure source port and an outlet port and a spool mounted in the sleeve kept in slide contact with the sleeve. Annular seals made of a resilient material are inserted in an annular groove formed in the inner surface of the sleeve. A spring is provided for biasing the spool axially. Valve portions are formed by shoulder portions on the annular seals and shoulder portions on the spool to open and close communication between the high-pressure source port and the outlet port and between the outlet port and the low-pressure source port as the spool moves. They are positioned so that when the spool moves in one direction, communication between the high-pressure source port and the outlet port opens and communication between the outlet port and the low-pressure source port is closed. At least one of the sectional areas of the slide contact portions between the spool and the sleeve and the sectional areas of the shoulder portions formed on the spool is greater or smaller than the others.

3 Claims, 3 Drawing Sheets

PROPORTIONAL PRESSURE CONTROL VALVE

This invention relates to a proportional pressure control valve for use in a fluid pressure circuit such as a hydraulic circuit.

There are known proportional pressure control valves having a high-pressure source port, a low-pressure source port and an outlet port and having either the function of controlling the pressure of the outlet port to a lower value than the pressure of the high pressure source by a predetermined amount or the function of controlling it to a higher value than the pressure of the low pressure source by a predetermined amount. Among this type of valves, valves which use a spool valve are widely known (e.g. from JP-A-02038175).

Valves of the type in which the valve-opening and valve-closing actions are repeated between a shoulder portion of a seal made of a soft, resilient material and a shoulder portion on the outer periphery of the spool valve are widely used as proportioning valves for controlling the brake pressure of vehicle rear wheels. Another example of a valve with a soft, resilient seal is disclosed in Japanese Patent Publication 3-223578 filed by the present inventors.

In the aforementioned proportional pressure control valve that uses a spool valve, the fluid pressure acting on the end of the spool and the biasing force of the biasing means have to be balanced. Thus, if the spool diameter is large, the biasing force required will be extremely large correspondingly. If the spool diameter is small, the fluid flow will be insufficient. Thus, for use in a high-pressure, large-flow application, an expensive multi-staged spool had to be used.

The above problem can be solved if a stepped spool has such a structure that the fluid pressure acts only on the stepped portions. But it is rather difficult to form stepped portions on the spool and the sleeve receiving the spool in coaxial relation to each other so that a clearance is defined therebetween with such an accuracy as to meet the requirement as a proportional pressure control valve.

In place of a stepped spool, an edge seal having a predetermined difference in diameter with respect to the slide contact portion could be used. But an edge seal does not reveal its sealing properties without an urging force. Also, in a liquid-sealed condition, axial movement of the valve body will be restrained. Thus, if it is desired to construct a proportional pressure valve having a valve portion at the high-pressure source side and a valve portion at the low-pressure source aligned axially, it will be very difficult to disconnect the outlet port from both the high-pressure source and the low-pressure source when an intended pressure is reached approximately. Such a structure is thus unpractical.

An object of this invention is to provide a compact proportional pressure control valve which can control high pressure with a small biasing force.

In order to solve the above problems, the present inventors took notice of the fact that if a liquid-sealing portion is formed by an annular seal made of a resilient material and the valve body made of a hard material such as metal and kept in contact with the annular seal, it shows a good liquid sealability and the diameter of seal can be made precisely equal to the diameter of the valve body and found that a valve structure comprising an annular seal made of a resilient material has a function comparable to a stepped spool in spite of the fact that it can be formed by forming steps only on the spool. The present invention applied this valve structure to a proportional pressure control valve.

Namely, according to this invention, there is provided a proportional pressure control valve comprising a sleeve having a high-pressure source port, a low-pressure source port and an outlet port formed therein and formed with a plurality of annular grooves in inner periphery thereof, a spool mounted in the sleeve so as to be in slide contact with the sleeve along a plurality of slide contact portions while keeping liquid tightness, a plurality of annular seals made of a resilient material and mounted liquid-tightly in the annular grooves formed in the sleeve, and a biasing means for biasing the spool axially, the spool having a plurality of shoulder portions on the outer periphery thereof, valve portions formed between the annular seals and the shoulder portions of the spool to open and close communication between the high-pressure source port and the outlet port and communication between the outlet port and the low-pressure source port as the spool moves, the valve portions being positioned so that when the spool moves in one direction, communication between the high-pressure source port and the outlet port is opened and communication between the outlet port and the low-pressure source port is closed, at least one of the sectional areas of the slide contact portions between the spool and the sleeve and the sectional areas of the shoulder portions formed on the spool being larger or smaller than the others by a predetermined amount, the biasing means has a biasing force which acts on the spool in such a direction as to counteract a fluid pressure that acts on the spool due to the predetermined amount of difference in the sectional area, wherein the valve portion between the high-pressure source and the outlet port is adapted to open when the pressure at the outlet port is lower than a pressure determined by a pressure difference corresponding to the biasing force of the biasing means and when it is larger, the valve portion between the outlet port and the low-pressure source port is adapted to open, thereby keeping the pressure difference substantially equal to the pressure corresponding to the biasing force.

From another aspect of this invention, there is provided a valve in which both ends of the spool communicate with the high-pressure side port or the outlet port so that an axial compressive force always acts on the spool. This arrangement makes it possible to divide both the sleeve and the spool into two separate parts, i.e. high-pressure side and low-pressure side portions.

We will now describe a proportional pressure control valve of the type in which the pressure difference between the outlet port and the low-pressure source port is controlled. But the function is the same with a valve in which the pressure difference between the output port and the high-pressure source port is controlled.

Sealing portions are formed by the shoulder portions formed on the inner periphery of the annular seals and the shoulder portions formed on the outer periphery of the spool. The sealing portions serve to open and close communication between the high-pressure source port and the outlet port and between the outlet port and the low-pressure source port as the spool moves in either direction. In order to control the pressure difference between the outlet port and the low-pressure source port, the diameter of the spool shoulder portion of the valve portion at the low-pressure source port side has to be greater than the diameter of the slide contact portion of the spool by a predetermined amount, while the spool slide contact portion has to have a diameter equal to that of the spool shoulder portion of the valve portion on the low-pressure source port side. We shall use $\Delta A$ to indicate the difference in sectional area owing to the difference in diameter between the slide contact portions and the shoulder portion of the spool of the valve portion at the low-pressure side.

Since the diameter of the slide contact portions of the spool is equal to the diameter of the shoulder portion of the spool on the high-pressure source port side, no axial force acts on the spool which results from the pressure at the high-pressure side port. In other words, the action of the proportional control valve does not depend upon the pressure difference between the high-pressure source port and the outlet port.

On the other hand, due to the difference in diameter between the slide contact portions and the shoulder portion of the valve portion on the low-pressure source port side, an axial force resulting from the pressure difference $\Delta P$ between the outlet port and the low-pressure source port and having a magnitude of $\Delta P \times \Delta A$ acts on the spool in such a direction as to open the valve portion on the low-pressure source port side.

If the biasing force F is greater than $\Delta P \times \Delta A$, the spool will move in such a direction as to open the valve portion on the high-pressure source port side and to close the valve portion on the low-pressure source port side. The pressure at the output port drops as a result. If $F < \Delta P \times \Delta A$, the spool will move in such a direction as to close the valve portion on the high-pressure source port side and to open the valve portion on the low-pressure source port side, so that the pressure at the output port will increase.

It is generally preferable to determine the distance between the two shoulders formed on the spool and to position the grooves formed in the sleeve for receiving the annular seals so that both the valve portions are closed when the condition $\Delta P \times \Delta A = F$ is reached. But they may be positioned in a different way so that both the valve portion on the high-pressure source port side and the low-pressure source port side will open when the condition $\Delta P \times \Delta A = F$ is reached.

In actually manufacturing the valve, each of the sleeve and the spool is preferably divided into two separate parts including, respectively, the valve portion on the high-pressure source port side and the valve portion on the low-pressure source port side. In order to simplify the structure, the valve portions may be provided on the end faces of the spool. Also, the high-pressure source port or the outlet port may be brought into communication with both end faces of the spool so that any axial pulling force may not act on the spool. This arrangement makes it possible to divide both the sleeve and the spool into two separate parts as mentioned above.

According to this invention, by using seals made of a soft, resilient material, high pressure can be controlled with a small biasing force while keeping a large opening area. The proportional pressure control valve of this invention has advantages comparable to a spool valve provided with high-precision steps but it is compact and can be manufactured at much lower cost.

Other features and objects of the present invention will become apparent from the following description taken with reference to the accompanying drawings, in which.

Figure 1:
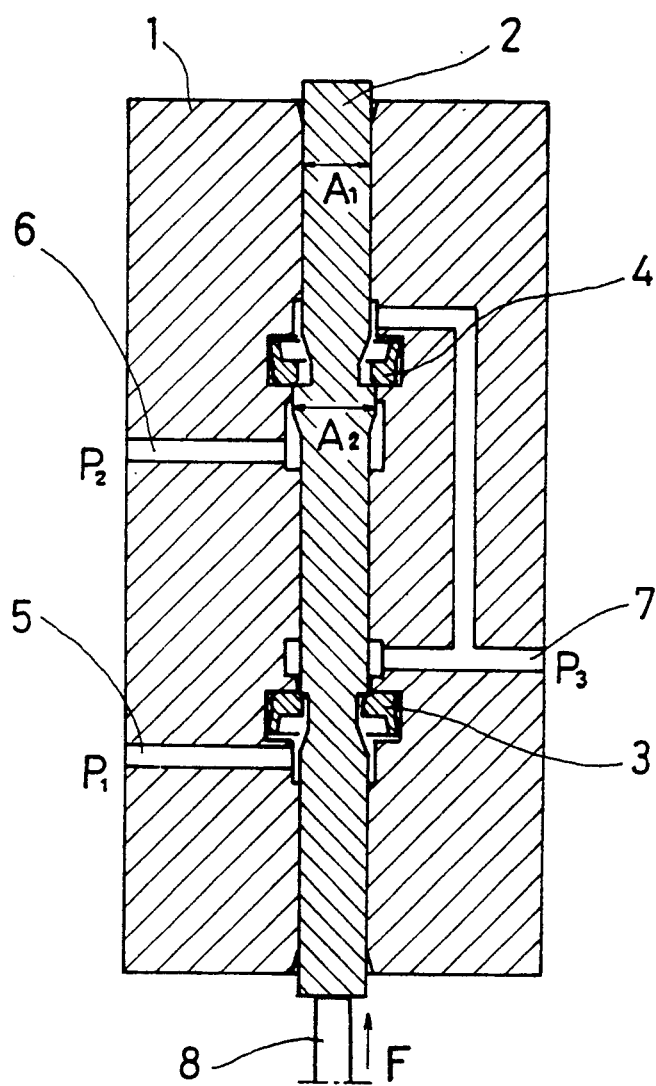
FIG. 1 is a vertical sectional side view of a first embodiment.

In the embodiment shown in FIG. 1, there are shown a sleeve 1, a spool 2 slidably mounted in the sleeve 1, and annular seals 3 and 4 liquid-tightly fitted in annular grooves formed in the inner periphery of the sleeve 1.

The sleeve 1 is provided with a high-pressure source port 5, a low-pressure source port 6 and an outlet 7, on which pressures P1, P2 and P3 act, respectively.

Numeral 8 designates a biasing means. F represents a biasing force applied by the biasing means 8 such as an electromagnet. A1 represents the sectional area of the spool 2 at a slide contact portion, which has a constant diameter up to a shoulder portion at which it contacts the seal 3 and separates from it. A2 represents the sectional area at a shoulder portion which comes into contact with and separates from the seal 4. Their relations are expressed by the equation, $A2 = A1 + \Delta A$ ($\Delta A > 0$).

Since the slide contact portion has the same sectional area as that of the shoulder portion of the spool which comes into contact with and separates from the seal 3, the pressure difference between P1 and P3 will not influence the axial force that acts on the spool. The axial force on the spool is equal to the product of $\Delta A$ and the pressure difference between P2 and P3, because $A2 = A1 + \Delta A$ ($\Delta A > 0$).

If $P3 > P2 + F/\Delta A$, a downward force acts on the spools 2 and moves it downwardly, so that the seal 3 comes into contact at its inner peripheral shoulder portion with the outer peripheral shoulder portion of the spool 2. Thus, the valve portion near the high-pressure source port is closed.

In this closed state, the spool receives little axial force resulting from the contact between the spool 2 and the seal 3 because the seal is made of a soft, resilient material. Thus, the spool can move further downwardly. As the spool moves further downwardly, the inner peripheral shoulder portion of the seal 4 separates from the outer peripheral shoulder portion of the spool 2 so that the valve portion at the low-pressure source port will open, thereby reducing the pressure P3 at the outlet port 7.

As the pressure P3 drops to the point at which the equation $P3 < P2 + F/\Delta A$ is satisfied, the spool 2 now begins to move upwardly and the pressure P3 begins to rise. The two valve portions will be closed when an equilibrium state is reached in which P3 is virtually equal to $P2 + F/\Delta A$ through there is a slight hysteresis resulting from the slide resistance for the spool and the axial force acting on the spool by the contact between the spool and the seal.

Since the two valve portions open and close in such a way as to satisfy the equation $P3 = P2 + F/\Delta A$ of the magnitude of F varies, this valve can be used as a proportional pressure control valve.

Figure 2:
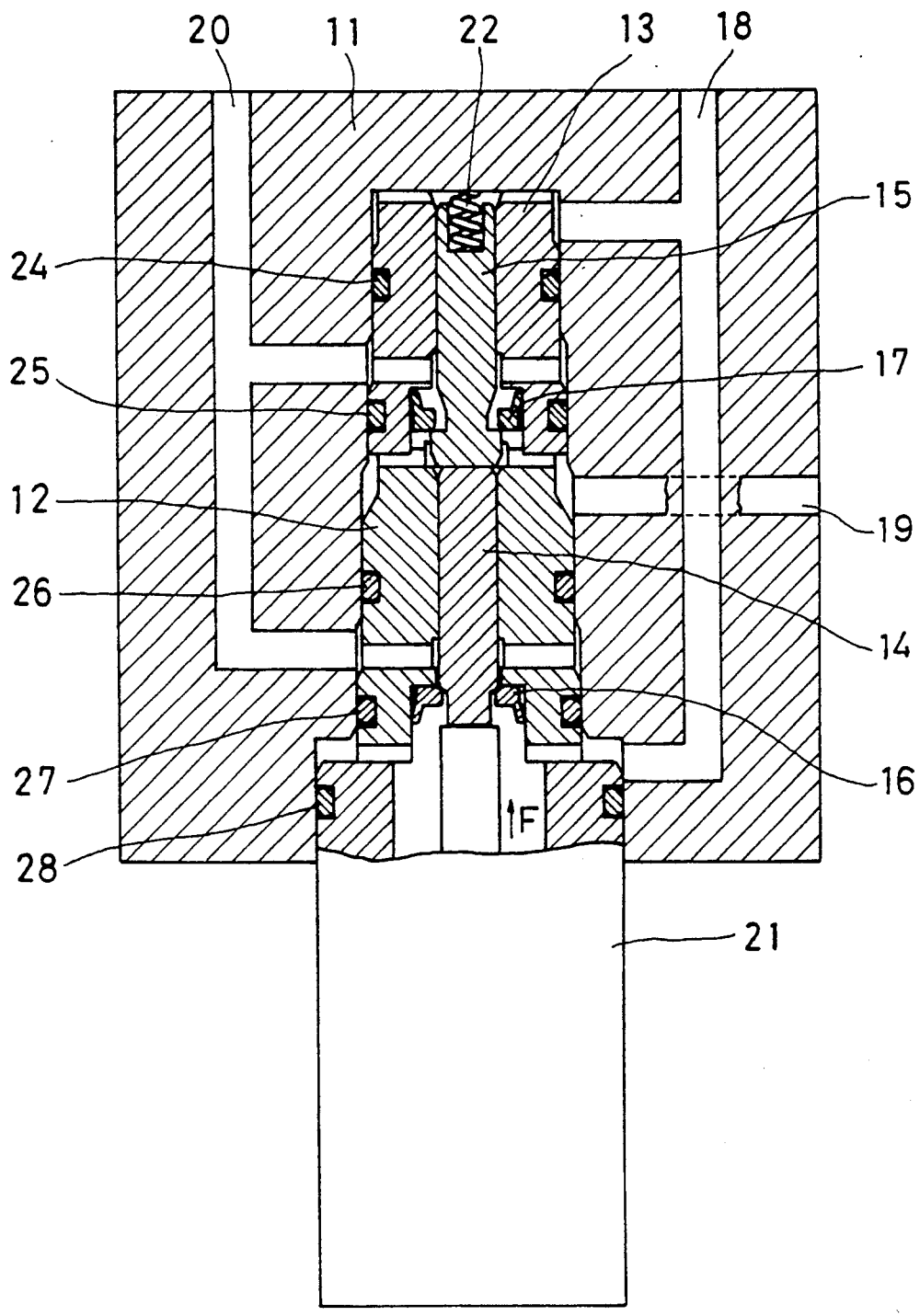
FIG. 2 is a vertical sectional side view of a second embodiment.

FIG. 2 shows the second embodiment in which the spool and the sleeve each comprise two separate parts. The two separate sleeves, i.e. a high-pressure side sleeve 12 and a low-pressure side sleeve 13, are accommodated in a single housing 11.

A high-pressure side spool 14 and a low-pressure side spool 15, which are mounted in the sleeves 12 and 13, respectively, have their abutting ends communicating with a low-pressure source port 19 and their ends opposite to the abutting ends communicating with a high-pressure source port 18. Thus, the high-pressure side spool 14 and the low-pressure side spool 15 are always pressed against each other and never get apart from each other.

The pressure of the high-pressure source port 18 acts on the end faces of the two spools opposite to the abutting ends. But since the slide contact portion of the low-pressure side spool 15 has the same diameter as that of the shoulder portion of the high-pressure side spool 14, the influence of the pressure of the high-pressure source port 18 is offset.

The pressure at an outlet port 20 formed in the housing 11 is transmitted through passages formed in the sleeves 12 and 13 into spaces defined by the slide contact portions and the shoulder portions of the respective spools 14 and 15. The slide contact portion of the high-pressure side spool 14 has the same diameter as that of its shoulder portion, while the shoulder portion of the low-pressure side spool 15 has a larger diameter than that of its slide contact portion by a predetermined amount. Thus, an axial force acts on the spools which is determined by the difference between the pressure at the outlet port and the pressure on the low-pressure side spool 15 and the difference in the sectional area due to the above-mentioned difference in diameter.

This embodiment has two valve portions, i.e. an annular seal 16 made of a soft, resilient material and adapted to come into contact with the shoulder of the sleeve 14 and an annular seal 17 made of a soft, resilient material and adapted to come into contact with the shoulder portion of the sleeve 15. These two valve portions open and close in such way that the relation $P3=P2+F/\Delta A$ is satisfied. Thus, the valve of this embodiment can be used as a proportional pressure control valve in the same way as the first embodiment.

Numerals 24 and 25 in FIG. 2 designate O rings which seal the space between the low-pressure side sleeve 13 and the housing 11. O rings 26, 27 which seal the space between the high-pressure side sleeve 12 and the housing 11. An O ring 28 seals the space between an electromagnet 21 and the housing 11.

Figure 3:
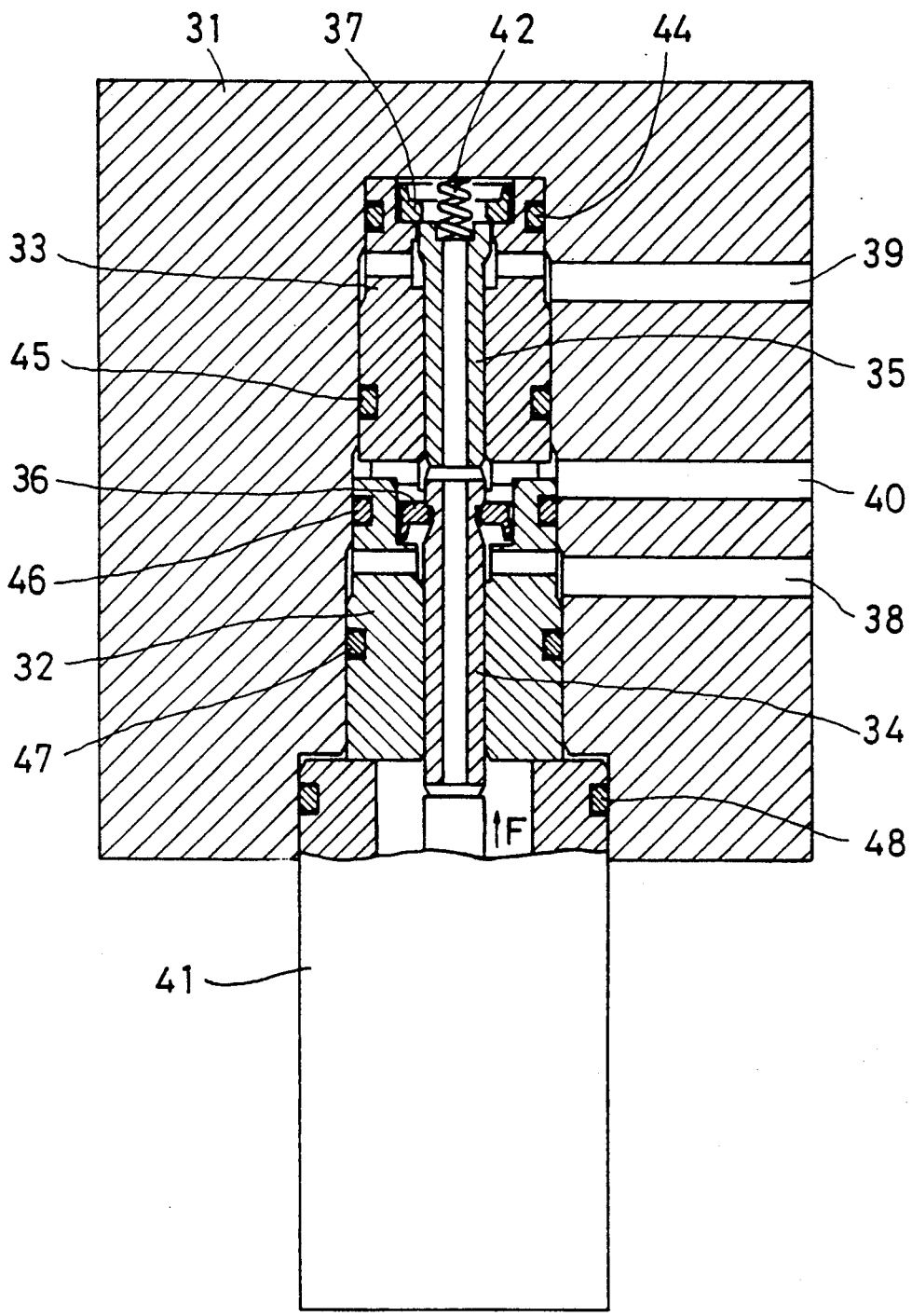
FIG. 3 is a vertical sectional side view of a third embodiment.

FIG. 3 shows the third embodiment which is similar to the second embodiment in that the spool and the sleeve each comprise two separate parts.

In this embodiment, numeral 31 designates a housing. In the same manner as in the second embodiment, a high-pressure side sleeve 32 and a low-pressure side sleeve 33 are accommodated in the housing 31. A high-pressure side spool 34 and a low-pressure side spool 35 in the form of pipes having through holes are mounted in the sleeves 32 and 33, respectively.

The high-pressure side spool 34 and the low-pressure side spool 35 have their end faces all in communication with an outlet port 40 provided in the housing 31. The shoulder portion of the low-pressure side spool 35 has a larger diameter than that of its slide contact portion by a predetermined amount, so that an axial force acts on the spools which is determined by the difference between the pressure at the outlet port 40 and the pressure at a low-pressure source port 39 and the difference in the sectional area which is related to the above-mentioned difference in diameter. This axial force serves to prevent the separation of the spools 34 and 35. This valve is also used as a proportional pressure control valve by balancing the axial force, the electromagnetic force F of an electromagnet 41 as a biasing means and the force of a spring 42.

Numeral 38 in FIG. 3 is a high-pressure source port. An annular seal 36 made of a soft, resilient material is adapted to come into contact with the shoulder portion of the sleeve 34. An annular seal 37 made of a soft, resilient material is adapted to come into contact with the end of the sleeve 35. O rings 44, 45 seal the space between the sleeve 33 and the housing 31. O rings 46, 47 seal the space between the sleeve 32 and the housing 31. An O ring 48 seals the space between the electromagnet 41 and the housing 31.

The structure of the third embodiment shown in FIG. 3 is not suitable for high-speed operation because the axial force, which serves to prevent separation of the two spools, is small compared with the structure of the second embodiment shown in FIG. 2, but has an advantage in that through holes can be formed in the spool because the pressures on all the end faces of the spools are the same and thus the housing structure can be simplified compared with the structure of FIG. 2. Selection should be made between the structure of FIG. 2 and that of FIG. 3 according to the intended use.

The proportional pressure control valves of the above embodiments are all of the type in which the pressure difference between the outlet port and the low-pressure source port is controlled and in which all the slide contact portions have the same diameter. But it is possible to construct a valve of the type in which the pressure difference between the outlet port and the high-pressure source port or the type in which the slide contact portions at the high pressure side and the low pressure side have different diameters from each other by balancing the axial force due to the difference in the fluid pressure with respect to the biasing force. If a spool comprising two separate parts is used, the two parts have to be kept in contact with each other.

What is claimed is:
1. A proportional pressure control valve comprising:
   a sleeve having a high-pressure source port, a low-pressure source port and an outlet port formed therein and formed with a plurality of annular grooves in inner periphery thereof,
   a spool mounted in said sleeve so as to be in slide contact with said sleeve along a plurality of slide contact portions while keeping liquid tightness,
   a plurality of annular seals made of a resilient material and mounted liquid-tightly in said annular grooves formed in said sleeve, and
   a biasing means for biasing said spool axially,
   said spool having a plurality of shoulder portions on the outer periphery thereof,
   valve portions formed between said annular seals and said shoulder portions of said spool to open and close communication between said high-pressure source port and said outlet port and communication between said outlet port and said low-pressure source port as the spool moves,
   said valve portions being positioned so that when said spool moves in one direction, communication between said high-pressure source port and said outlet port is opened and communication between said outlet port and said low-pressure source port is closed,
   at least one of the sectional areas of said slide contact portions between said spool and said sleeve and the sectional areas of said shoulder portions formed on said spool being different from the others by a predetermined amount, said biasing means being adapted to urge said spool in such a direction as to counteract a fluid pressure that acts on said spool due to said predetermined amount of difference in the sectional area, wherein the valve portion for controlling communication between said high-pressure source and said outlet port will open when the pressure at said outlet port is lower than a pressure determined by a pressure difference corresponding to the biasing force of said biasing means and when it is higher than that, the valve portion for controlling communication between said outlet port and said low-pressure source port will open, thereby keeping said pressure difference substantially equal to the pressure corresponding to said biasing force.

2. A proportional pressure control valve as claimed in claim 1 wherein said spool has both end faces thereof communicating with said high-pressure source port and said shoulder portion for the valve portion for controlling communication between said high-pressure source port and said outlet port is formed on one end face of said spool.

3. A proportional pressure control valve as claimed in claim 1 wherein said spool has both end faces thereof communicating with said outlet port and said shoulder portion for the valve portion for controlling communication between said outlet port and said low-pressure source port is formed on one end face of said spool.

* * * * *